(12) United States Patent
Liu et al.

(10) Patent No.: US 10,904,760 B2
(45) Date of Patent: Jan. 26, 2021

(54) DATA TRANSMISSION METHOD, APPARATUS, AND DEVICE

(71) Applicant: Huawei Technologies Co., Ltd., Guangdong (CN)

(72) Inventors: Jing Liu, Shanghai (CN); Min Huang, Shenzhen (CN); Bing Shu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 121 days.

(21) Appl. No.: 16/023,170

(22) Filed: Jun. 29, 2018

(65) Prior Publication Data
US 2018/0323971 A1    Nov. 8, 2018

Related U.S. Application Data

(63) Continuation of application No. PCT/CN2015/100252, filed on Dec. 31, 2015.

(51) Int. Cl.
*H04W 12/08* (2009.01)
*H04W 76/27* (2018.01)
(Continued)

(52) U.S. Cl.
CPC .......... *H04W 12/08* (2013.01); *H04L 5/0055* (2013.01); *H04L 9/00* (2013.01); *H04L 9/30* (2013.01);
(Continued)

(58) Field of Classification Search
CPC ....... H04L 9/0825; H04L 9/32; H04L 9/3247; H04L 63/0442
See application file for complete search history.

(56) References Cited

U.S. PATENT DOCUMENTS 6,044,155 A * 3/2000 Thomlinson ........ G06F 21/6245
380/277
6,842,628 B1    1/2005 Arnold et al.
(Continued)

FOREIGN PATENT DOCUMENTS

CN    101626294 A    1/2010
CN    102761560 A    10/2012
(Continued)

OTHER PUBLICATIONS

Wikipedia, "Digital signature", Dec. 8, 2015, retrieved from the internet on Aug. 9, 2018, 12 pages, XP055498591.
(Continued)

*Primary Examiner* — Ponnoreay Pich
(74) *Attorney, Agent, or Firm* — Kilpatrick Townsend & Stockton LLP

(57) ABSTRACT

Embodiments of the present disclosure provide a data transmission method, apparatus, and device. The method includes: performing, by a terminal, encryption and integrity protection on a data packet by using a public key of a network device and a private key of the terminal, where the data packet includes user data; and sending, by the terminal, the data packet to the network device, to send the user data to a server by using the network device. Encryption and integrity protection are performed on the data packet respectively by using the public key of the network device and the private key of the terminal, and when no radio resource control RRC connection is established, the data packet is sent to the network device.

10 Claims, 9 Drawing Sheets

(51) Int. Cl.
*H04L 9/32* (2006.01)
*H04L 9/00* (2006.01)
*H04W 12/04* (2009.01)
*H04W 12/10* (2009.01)
*H04L 5/00* (2006.01)
*H04L 9/30* (2006.01)
*H04L 12/66* (2006.01)
*H04L 29/06* (2006.01)

(52) U.S. Cl.
CPC ............ *H04L 9/32* (2013.01); *H04L 12/66* (2013.01); *H04W 12/04031* (2019.01); *H04W 12/04033* (2019.01); *H04W 12/1006* (2019.01); *H04W 12/1008* (2019.01); *H04W 76/27* (2018.02); *H04L 63/0442* (2013.01)

(56) References Cited

U.S. PATENT DOCUMENTS

| | | | |
|---|---|---|---|
| 8,412,943 B2* | 4/2013 | Pang | G06F 21/445 713/176 |
| 9,220,012 B1 | 12/2015 | Inamdar | |
| 2004/0111610 A1* | 6/2004 | Slick | H04L 63/0428 713/160 |
| 2006/0171536 A1 | 8/2006 | Lim | |
| 2010/0268954 A1* | 10/2010 | Pang | H04L 9/0847 713/171 |
| 2012/0163311 A1 | 6/2012 | Park | |
| 2013/0227294 A1 | 8/2013 | Senese et al. | |
| 2014/0119544 A1 | 5/2014 | Lee et al. | |
| 2015/0071139 A1 | 3/2015 | Nix | |
| 2016/0119304 A1* | 4/2016 | Lelcuk | H04L 63/08 726/3 |
| 2018/0323971 A1* | 11/2018 | Liu | H04L 9/00 |

FOREIGN PATENT DOCUMENTS

| | | |
|---|---|---|
| CN | 103813333 A | 5/2014 |
| CN | 104737572 A | 6/2015 |
| CN | 104955040 A | 9/2015 |
| EP | 2533457 A1 | 12/2012 |

OTHER PUBLICATIONS

Zhou Qiang et al, Research Progress of Data Integrity for Data Aggregation in Wireleess Sensor Networks. Journal of Nanjing University of Posts and Telecommunications(Natural Science), vol. 34, No. 3, Jun. 2014, 11 pages.

* cited by examiner

DATA TRANSMISSION METHOD, APPARATUS, AND DEVICE

CROSS-REFERENCE TO RELATED APPLICATIONS

This application is a continuation of International Application No. PCT/CN2015/100252, filed on Dec. 31, 2015, the disclosure of which is hereby incorporated by reference in its entirety.

TECHNICAL FIELD

The present application relates to the communications field, and in particular, to a data transmission method, apparatus, and device.

BACKGROUND

To ensure data transmission security, user equipment (UE) and a network side need to perform a security authentication and key negotiation process before performing data transmission.

In an existing Long Term Evolution (LTE) mechanism, UE needs to perform a security authentication and key negotiation process with a network side (including a base station and a mobility management entity (MME)) after the UE has established a radio resource control (RRC) connection to an evolved NodeB (eNB). Specifically, the UE and the network side implement the security authentication and key negotiation process between each other according to an evolved packet system (EPS) authentication and key agreement (AKA) protocol by using an authentication, authorization, and accounting (AAA) server. Then, the UE uses an negotiated key to encrypt data and transmits the encrypted data.

In the prior art, before performing data encryption transmission, the UE needs to negotiate with a third-party AAA server to obtain an encryption key. Consequently, an entire data transmission process is complex.

SUMMARY

This application provides a data transmission method, apparatus, and device, so as to resolve a problem in the prior art that an entire data transmission process is complex because UE needs to negotiate with a third-party AAA server to obtain an encryption key.

According to a first aspect, a data transmission method is provided, where the method includes:

obtaining, by a terminal, a public key of a network device;

performing, by the terminal, encryption on a data packet by using the public key of the network device, and performing integrity protection on the data packet by using a private key of the terminal, where the data packet includes user data; and sending, by the terminal, the data packet to the network device, to send the user data to a server by using the network device.

The terminal performs encryption on the data packet by using the public key of the network device and performs integrity protection on the data packet by using the private key of the terminal, and then sends the data packet to the network device, to send the user data to the server by using the network device. In a data transmission process, an asymmetric encryption manner is directly used to perform encryption and integrity protection on the user data, and steps such as performing security authentication and key negotiation with an AAA server are not required. The data transmission process is simple, and transmitted data security is ensured.

With reference to the first aspect, in a first implementation of the first aspect, the obtaining, by the terminal, a public key of the network device includes:

receiving, by the terminal, system information that is sent by a base station, where the system information includes the public key of the network device; and obtaining, by the terminal, the public key of the network device from the system information.

In this implementation, the base station adds the public key of the network device to the system information and transmits the system information to the terminal, instead of using a new message to transmit the public key of the network device. This saves resources.

With reference to the first implementation of the first aspect, in a second implementation of the first aspect, when the network device is a gateway, the system information further includes a network device identifier corresponding to the public key of the network device.

In this implementation, the network device identifier is carried in the system information. The system information can carry public keys of a plurality of network devices, and the terminal can select, depending on a service requirement, a public key corresponding to a suitable network device identifier for data encryption.

With reference to the first implementation of the first aspect or the second implementation of the first aspect, in a third implementation of the first aspect, the system information further includes algorithm indication information, and the algorithm indication information is used to indicate an encryption algorithm and an integrity protection algorithm that are to be used by the terminal to perform encryption and integrity protection on the data packet.

With reference to the third implementation of the first aspect, in a fourth implementation of the first aspect, the performing, by the terminal, encryption on a data packet by using the public key of the network device, and performing integrity protection on the data packet by using a private key of the terminal includes:

obtaining, by the terminal, the algorithm indication information from the system information; and performing, by the terminal, encryption and integrity protection on the data packet by using the encryption algorithm and the integrity protection algorithm that are indicated by the algorithm indication information, the public key of the network device, and the private key of the terminal, where the public key of the network device is used to perform encryption on the data packet, and the private key of the terminal is used to perform integrity protection on the data packet.

In this implementation, the terminal obtains the algorithm indication information from the system information and then, performs encryption and integrity protection on the data packet based on the algorithm indication information, the public key of the network device, and the private key of the terminal.

With reference to any one of the first aspect or the first implementation of the first aspect to the fourth implementation of the first aspect, in a fifth implementation of the first aspect, the sending, by the terminal, the data packet to the network device includes:

sending, by the terminal, the data packet to the network device when no radio resource control RRC connection is established.

In the data transmission process, no RRC connection needs to be established, and steps such as performing security authentication and key negotiation with the AAA server are not required. This reduces signaling overheads and resource consumption.

With reference to the fifth implementation of the first aspect, in a sixth implementation of the first aspect, the sending, by the terminal, the data packet to the network device when no radio resource control RRC connection is established includes:

when no radio resource control RRC connection to the base station is established, sending, by the terminal, the data packet to the network device by using an uplink resource allocated by the base station, where the uplink resource allocated by the base station is a resource occupied for sending a preamble sequence by the terminal or a resource occupied for sending an RRC connection setup request message.

In this implementation, the data packet is sent by using the resource occupied for sending the preamble sequence by the terminal or the resource occupied for sending the RRC connection setup request message, without establishing an RRC connection or an S1 connection. This reduces resource consumption.

With reference to any one of the first aspect or the first implementation of the first aspect to the sixth implementation of the first aspect, in a seventh implementation of the first aspect, the data packet further includes a user identifier and a uniform resource locator of the server, and the user identifier is used to identify the terminal in a data transmission process.

With reference to the seventh implementation of the first aspect, in an eighth implementation of the first aspect, the method further includes:

when receiving an acknowledgment data packet that is sent by the network device, performing, by the terminal, integrity check on the acknowledgment data packet by using the public key of the network device, to verify validity of a network device identity and integrity of the acknowledgment data packet; and updating, by the terminal, the user identifier when the acknowledgment data packet passes integrity check, where the acknowledgment data packet is sent after the network device receives the data packet and the data packet passes integrity check.

In this implementation, the user identifier is updated after the acknowledgment data packet is obtained and verified. This updating is performed simultaneously with a gateway, to prevent the terminal being faked during subsequent data transmission.

With reference to any one of the first aspect or the first implementation of the first aspect to the eighth implementation of the first aspect, in a ninth implementation of the first aspect, the network device is a base station or a gateway.

According to a second aspect, a data transmission method is provided, where the method includes:

receiving, by a network device, a data packet that is sent by a terminal, where the data packet is encrypted by using a public key of the network device and is integrity protected by using a private key of the terminal;

performing, by the network device, decryption on the data packet by using a private key of the network device, to obtain user data, where the data packet includes the user data;

performing, by the network device, integrity check on the data packet by using a public key of the terminal, to verify validity of a terminal identity and integrity of the data packet; and sending, by the network device, the user data to a server when the data packet passes integrity check.

The network device receives the data packet that is sent by the terminal. The data packet is encrypted by using the public key of the network device and is integrity protected by using the private key of the terminal, and the data packet is sent by the terminal when no RRC connection is established. After performing decryption on the data packet and verifying the integrity of the data packet, the network device sends the user data to the server. In a data transmission process, an asymmetric encryption manner is directly used to perform encryption and integrity protection on the user data, and steps such as performing security authentication and key negotiation with an AAA server are not required. The data transmission process is simple, and transmitted data security is ensured.

With reference to the second aspect, in a first implementation of the second aspect, the data packet is sent by the terminal when no radio resource control RRC connection is established.

In the data transmission process, no RRC connection to the terminal needs to be established, and steps such as performing security authentication and key negotiation with the AAA server are not required. This reduces signaling overheads and resource consumption.

With reference to the second aspect or the first implementation of the second aspect, in a second implementation of the second aspect, the data packet further includes a user identifier, and the user identifier is used to identify the terminal in a data transmission process.

With reference to the second implementation of the second aspect, in a third implementation of the second aspect, the method further includes:

obtaining, by the network device, the public key of the terminal.

With reference to the third implementation of the second aspect, in a fourth implementation of the second aspect, the obtaining, by the network device, the public key of the terminal includes:

obtaining, by the network device, the user identifier; and obtaining, by the network device from a home subscriber server based on the user identifier, the public key of the terminal corresponding to the user identifier; or the obtaining, by the network device, the public key of the terminal includes:

obtaining, by the network device, the user identifier;

locally searching for, by the network device, context information corresponding to the user identifier; and obtaining, by the network device, the public key of the terminal from the context information corresponding to the user identifier.

In this implementation, if the network device locally stores the context information corresponding to the user identifier, the network device directly obtains the public key of the terminal from the local context information. If there is no context information corresponding to the user identifier on the network device, the network device needs to obtain the public key of the terminal from the home subscriber server.

With reference to the fourth implementation of the second aspect, in a fifth implementation of the second aspect, when the network device is a gateway, the obtaining, by the network device from a home subscriber server based on the user identifier, the public key of the terminal corresponding to the user identifier includes:

sending, by the network device, the user identifier to the home subscriber server; and receiving, by the network device, the user identifier and the corresponding public key of the terminal that are returned by the home subscriber server.

With reference to the fourth implementation of the second aspect, in a sixth implementation of the second aspect, when the network device is a base station, the obtaining, by the network device from a home subscriber server based on the user identifier, the public key of the terminal corresponding to the user identifier includes:

sending, by the network device, the user identifier to a gateway; and receiving, by the network device, the user identifier and the corresponding public key of the terminal that are returned by the gateway, where the public key of the terminal returned by the gateway is obtained by the gateway from the home subscriber server.

With reference to the second aspect or the first implementation of the second aspect, in a seventh implementation of the second aspect, the data packet further includes a uniform resource locator of the server.

With reference to the seventh implementation of the second aspect, in an eighth implementation of the second aspect, when the network device is a gateway, the sending, by the network device, the user data to a server includes:

obtaining, by the network device, an Internet Protocol IP address of the server based on the uniform resource locator of the server;

establishing, by the network device, a Transmission Control Protocol TCP connection to the server by using the IP address of the server; and sending, by the network device, the user data to the server through the TCP connection.

With reference to the seventh implementation of the second aspect, in a ninth implementation of the second aspect, when the network device is a base station, the sending, by the network device, the user data to a server includes:

sending, by the network device, the uniform resource locator of the server and the user data to a gateway, so that the gateway sends the user data to the server.

With reference to any one of the second aspect or the first implementation of the second aspect to the ninth implementation of the second aspect, in a tenth implementation of the second aspect, the method further includes:

updating, by the network device, the user identifier when the data packet passes integrity check.

With reference to any one of the second aspect or the first implementation of the second aspect to the tenth implementation of the second aspect, in an eleventh implementation of the second aspect, the method further includes:

sending, by the network device, an acknowledgment data packet to the terminal after the data packet passes integrity check, where the acknowledgment data packet is sent after the network device receives the data packet and the data packet passes integrity check.

With reference to any one of the second aspect or the first implementation of the second aspect to the eleventh implementation of the second aspect, in a twelfth implementation of the second aspect, the method further includes:

sending, by the network device, the public key of the network device and algorithm indication information to the terminal.

With reference to any one of the second aspect or the first implementation of the second aspect to the twelfth implementation of the second aspect, in a thirteenth implementation of the second aspect, when the network device is a gateway, the method further includes:

sending, by the network device, a network device identifier corresponding to the public key of the network device to the terminal.

According to a third aspect, a data transmission apparatus is provided. The apparatus includes several units, such as an obtaining unit, an encryption unit, and a sending unit, and the several units are configured to implement the method provided in the first aspect.

According to a fourth aspect, a data transmission apparatus is provided. The apparatus includes several units, such as a receiving unit, a decryption unit, a verification unit, and a sending unit, and the several units are configured to implement the method provided in the second aspect.

According to a fifth aspect, a data transmission device is provided. The data transmission device includes a processor, a memory, and a communications unit. The memory is configured to store a software program and a module. The processor runs or executes the software program and/or the module stored in the memory, to implement the method according to the first aspect.

According to a sixth aspect, a data transmission device is provided. The data transmission device includes a processor, a memory, and a communications unit. The communications unit includes a communications interface or a receiver and a transmitter. The memory is configured to store a software program and a module. The processor runs or executes the software program and/or the module stored in the memory, to implement the method according to the second aspect.

According to a seventh aspect, a computer readable storage medium is provided. The computer readable storage medium is configured to store program code that is executed by the foregoing processor during service transmission. The program code includes an instruction that is used to implement the method provided in the first aspect.

According to an eighth aspect, a computer readable storage medium is provided. The computer readable storage medium is configured to store program code that is executed by the foregoing processor during service transmission. The program code includes an instruction that is used to implement the method provided in the second aspect.

Beneficial effects of the technical solutions provided by the embodiments of the present disclosure are as follows:

The terminal performs encryption on the data packet by using the public key of the network device and performs integrity protection on the data packet by using the private key of the terminal, and then sends the data packet to the network device, to send the user data to the server by using the network device. In the data transmission process, an asymmetric encryption manner is directly used to perform encryption and integrity protection on the user data, and steps such as performing security authentication and key negotiation with an AAA server are not required. The data transmission process is simple, and transmitted data security is ensured.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

For ease of description of the embodiments, the following first briefly describes an application scenario of the embodiments of the present disclosure.

Figure 1:
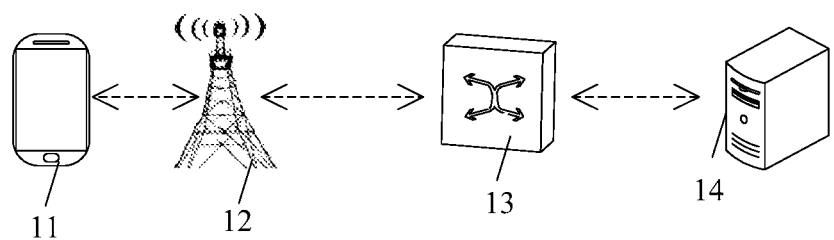
FIG. 1 is a schematic diagram of an application architecture according to an embodiment of the present disclosure.

FIG. 1 shows an application architecture that is provided in an embodiment of the present disclosure. The application architecture mainly includes a terminal 11, a base station 12, a gateway 13, and a server 14. The terminal 11 transmits data to the server 14 through the base station 12 and the gateway 13 in sequence.

The data transmitted by the terminal 11 may be a small-sized traffic data packet or may be another type of data packet. Small-sized traffic is a service for which a data amount of user data transmitted each time is relatively small. For example, for a machine type communication (MTC) service, a size of user data transmitted each time is usually 20 to 200 bytes. The small-sized traffic data packet is usually transmitted periodically, for example, transmitted once per second or transmitted once per hour.

In a typical small-sized traffic application scenario, the base station 12 may be an eNB, the gateway 13 may be an MTC gateway, and the server 14 may be an MTC server.

In the prior art, for small-sized traffic (such as an MTC service), data packets are transmitted at intervals, and a data amount transmitted each time is very small. To better reduce energy consumption of UE, the UE enters an active state when there is data to be transmitted; the UE enters an idle state when there is no data to be transmitted. When the UE switches from the idle state to the active state, an RRC connection needs to be re-established, and a security authentication and key negotiation process needs to be performed. Therefore, due to small-sized traffic characteristics that data packets are transmitted at intervals and a data amount is small, an RRC connection and an S1 connection need to be re-established and security authentication and key negotiation need to be performed each time when data is to be transmitted for the small-sized traffic. Consequently, a large amount of RRC signaling and S1 signaling is generated and a large quantity of resources are consumed.

In the embodiments of the present disclosure, an RRC connection does not need to be established between the terminal 11 and the base station 12 before data packet transmission. Instead, a data packet is directly sent in a connectionless state (when no RRC connection is established), and data encryption and integrity protection, and identity verification of a terminal and a network device are implemented in an asymmetric key manner. For specific implementation, refer to the following.

An asymmetric key includes two keys: a public key and a private key. The public key and the private key are a pair. If a transmitter uses a public key to encrypt data, a receiver can decrypt the data by using only a corresponding private key. If the transmitter uses a private key to perform integrity protection on data, the receiver can perform integrity check on the data by using only a corresponding public key.

The terminal 11 in the present disclosure may include a wireless communication function-embedded handheld device, an in-vehicle device, a wearable device, a computing device, or another processing device connected to a wireless modem, or various forms of user equipment (UE), mobile stations (MS), terminal equipment, or the like.

It should be noted that the foregoing device types are only examples, and do not constitute any limitation to the present disclosure.

Figure 2:
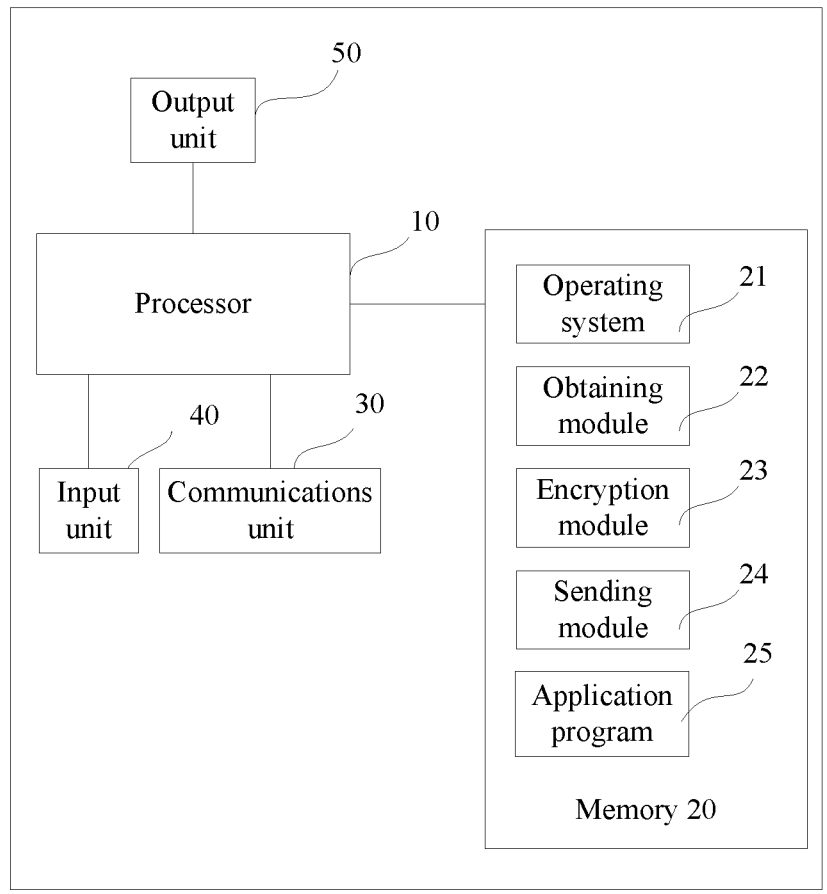
FIG. 2 is a schematic structural diagram of a terminal according to an embodiment of the present disclosure.

FIG. 2 is a schematic diagram of a possible hardware structure of the terminal shown in FIG. 1. As shown in FIG. 2, the terminal 11 includes a processor 10, a memory 20, and a communications unit 30. A person skilled in the art may understand that the structure shown in FIG. 2 does not constitute any limitation to the terminal. The terminal may include more or fewer components than those shown in the figure, or a combination of some components, or components disposed differently.

The processor 10 is a control center of the terminal, and connects various parts of the entire terminal by using various interfaces or lines, and performs various functions of the terminal and processes data by running or executing a software program stored in the memory 20 and/or a module stored in the memory 20 and invoking data stored in the memory 20, to perform overall control on the terminal. The processor 10 may be implemented by a CPU or may be implemented by a network processor (NP) having a control plane function.

The memory 20 may be configured to store a software program and a module. The processor 10 runs the software program and the module that are stored in the memory 20, to implement various function applications and process data. The memory 20 may mainly include a program storage area and a data storage area. The program storage area may store an operating system 21, an obtaining module 22, an encryption module 23, a sending module 24, an application program 25 (for example, an encryption program) required by at least one function, and the like. The data storage area may store data (for example, a public key of a network device) created based on use of the terminal, and the like. The memory 20 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Accordingly, the memory 20 may further include a memory controller to support access of the processor 10 to the memory 20.

The processor 10 runs the obtaining module 22 to perform the following function: obtaining the public key of the network device. The processor 10 runs the encryption module 23 to perform the following functions: performing encryption on a data packet by using the public key of the network device, and performing integrity protection on the data packet by using a private key of the terminal, where the data packet includes user data. The processor 10 runs the sending module 24 to perform the following function: sending the data packet to the network device by using the communications unit 30, to send the user data to a server by using the network device.

The communications unit 30 is configured to establish a communication channel, so that the terminal device communicates with the network device by using the communication channel, to implement data transmission. The communications unit 30 may include a communications module such as a wireless local area network (wireless LAN) module, a Bluetooth module, or a baseband module, and a radio frequency (RF) circuit that is corresponding to the communications module and that is configured to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications unit 30 is configured to control communication of components of the terminal 11, and may support direct memory access.

In different implementations of the present disclosure, various communications modules of the communications unit 30 are usually in a form of an integrated circuit chip, and may be selectively combined and all communications modules and corresponding antenna groups are not necessarily included. For example, the communications unit 30 may include only a baseband chip, a radio frequency chip, and a corresponding antenna, to provide a communication function in a cellular communications system. The terminal 11 may be connected to a cellular network or the Internet through a wireless communication connection established by the communications unit, for example, wireless local area network access or WCDMA access.

The radio frequency circuit is configured to send and receive information or send and receive a signal during a call. For example, the radio frequency circuit receives downlink information from a base station and sends the downlink information to a processing unit for processing, and sends uplink data to the base station. Generally, the radio frequency circuit includes a known circuit configured to perform these functions, including but not limited to an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further bidirectionally communicate with a network and another device through radio communications. The radio communications may be implemented by using any communications standard or protocol, including but not limited to GSM, GPRS, CDMA, WCDMA, High Speed Uplink Packet Access (HSUPA), WiMAX, LTE, email, short message service (SMS), and the like.

Further, the terminal 11 may further include an input unit 40, an output unit 50, and the like.

The input unit 40 is configured to implement interaction between a user and the terminal device and/or information input into the terminal device. For example, the input unit 40 may receive number or character information that is entered by the user, to generate signal input related to user settings or function control. In a specific implementation of the present disclosure, the input unit 40 may be a touch panel, may be another human-computer interaction interface, for example, a substantive input key or a microphone, or may be another external information capture apparatus, for example, a camera. The touch panel, also referred to as a touchscreen, can collect an operation action that is performed by a user by touching the touch panel or performed in a position near the touch panel, for example, an operation action that is performed by the user on the touch panel or in a position near the touch panel by using a finger, a stylus, or any other suitable object or accessory, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then sends the contact coordinates to a processing unit. The touch controller can further receive and execute a command that is sent by the processing unit. In addition, the touch panel may be implemented in a plurality of types, such as a resistive type, a capacitive type, an infrared type, and a surface acoustic wave type. In another implementation of the present disclosure, the substantive input key used by the input unit may include but is not limited to one or more of a physical keyboard, a function button (for example, a volume control button or an on/off button), a trackball, a mouse, a joystick, and the like. A microphone-form input unit can collect voice that is input by the user or from an environment, and convert the voice into a command that is in a form of an electrical signal and that can be executed by the processing unit.

In some other implementations of the present disclosure, the input unit 40 may further be various sensing devices, such as a Hall device, configured to detect a physical quantity of the terminal device such as force, torque, pressure, stress, a location, displacement, a speed, acceleration, an angle, an angular speed, a revolution, a rotating speed, or a working state change time, and convert the physical quantity into an electric quantity to perform detection and control. Some other sensing devices may include a gravity sensor, a tri-axis accelerometer, a gyroscope, and the like.

The output unit 50 includes but is not limited to an image output unit and a sound output unit. The image output unit is configured to output a character, a picture, and/or a video. The image output unit may include a display panel, for example, a display panel configured in a form of a liquid crystal display LCD), an organic light-emitting diode (OLED), a field emission display (FED), or the like. Alternatively, the image output unit may include a reflective display, for example, an electrophoretic display or a display using an interferometric modulation of light technology. The image output unit may include a single display or a plurality of displays of different sizes. In a specific implementation of the present disclosure, the touch panel used by the input unit 40 may also be used as the display panel of the output unit. For example, after the touch panel detects a gesture operation performed by touching the touch panel or performed in a position near the touch panel, the touch panel transfers the gesture operation to a processing unit to determine a touch event type. Then, the processing unit provides corresponding visual output on the display panel based on the touch event type. In FIG. 2, although the input unit 40 and the output unit 50 are used as two separate components to implement input and output functions of the terminal 11, in some embodiments, the touch panel and the display panel may be integrated as a whole to implement the input and output functions of the terminal device. For example, the image output unit may display various graphical user interfaces (GUI) that are used as virtual control components, including but not limited to a window, a scroll bar, an icon, and a scrapbook, for a user to perform an operation in a touch manner.

Figure 3:
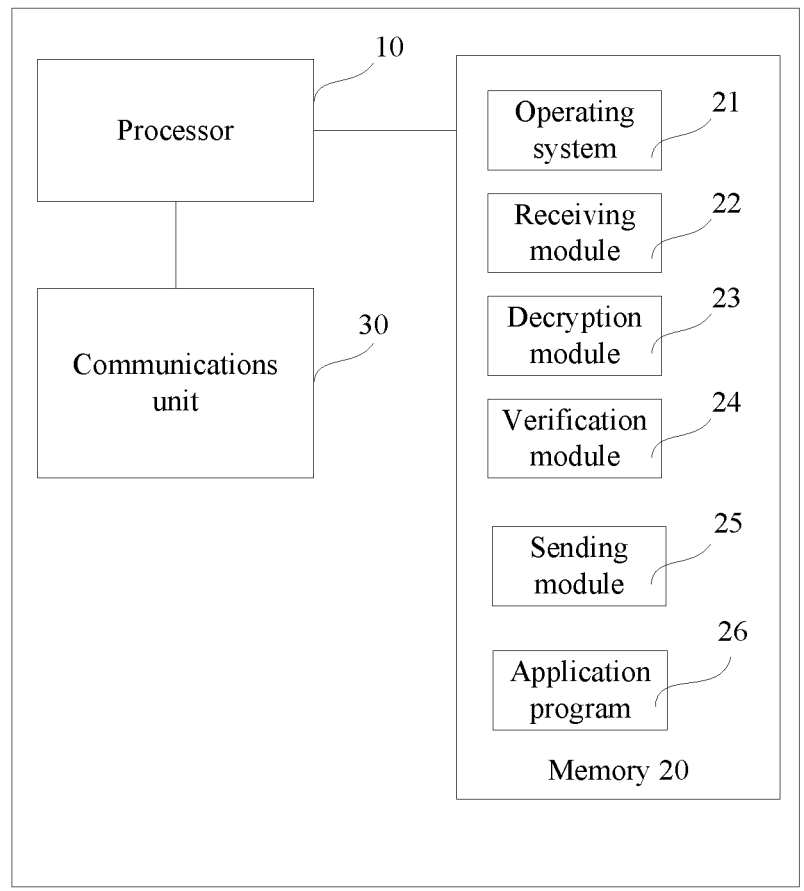
FIG. 3 is a schematic structural diagram of a base station or a gateway according to an embodiment of the present disclosure.

FIG. 3 is a schematic diagram of a possible hardware structure of the network device shown in FIG. 1. As shown in FIG. 3, the base station 12 or the gateway 13 includes a processor 10, a memory 20, and a communications unit 30 (the communications unit includes a receiver and a transmitter (corresponding to the base station)). Alternatively, the communications unit includes a communications interface (corresponding to the gateway). A person skilled in the art may understand that the structure shown in FIG. 3 does not constitute any limitation to the network device. The network device may include more or fewer components than those shown in the figure, or a combination of some components, or components disposed differently.

The processor 10 is a control center of the network device, and connects various parts of the entire network device by using various interfaces or lines, and performs various functions of the network device and processes data by running or executing a software program stored in the memory 20 and/or a module stored in the memory 20 and invoking data stored in the memory 20, to perform overall control on the network device. The processor 10 may be implemented by a CPU or may be implemented by a network processor (NP) having a control plane function.

The memory 20 may be configured to store a software program and a module. The processor 10 runs the software program and the module that are stored in the memory 20, to implement various function applications and process data. The memory 20 may mainly include a program storage area and a data storage area. The program storage area may store an operating system 21, a receiving module 22, a decryption module 23, a verification module 24, a sending module 25, and an application program 26 (such as a decryption program) required by at least one function, and the like. The data storage area may store data (such as a private key of the network device) that is created based on use of the network device, and the like. The memory 20 may be implemented by any type of volatile or non-volatile storage device or by a combination thereof, for example, a static random access memory (English: Static Random Access Memory, SRAM for short), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Accordingly, the memory 20 may further include a memory controller to support access of the processor 10 to the memory 20.

The processor 10 runs the receiving module 22 to perform the following function: receiving, by using the communications unit 30, a data packet that is sent by a terminal, where the data packet is encrypted by using a public key of the network device and is integrity protected by using a private key of the terminal. The processor 10 runs the decryption module 23 to perform the following function: using the private key of the network device to decrypt the data packet, to obtain user data, where the data packet includes the user data. The processor 10 runs the verification module 24 to perform the following function: performing integrity check on the data packet by using a public key of the terminal, to verify validity of a terminal identity and integrity of the data packet. The processor 10 runs the sending module 25 to perform the following function: sending, by using the communications unit 30, the user data to a server when the data packet passes integrity check.

Figure 4:
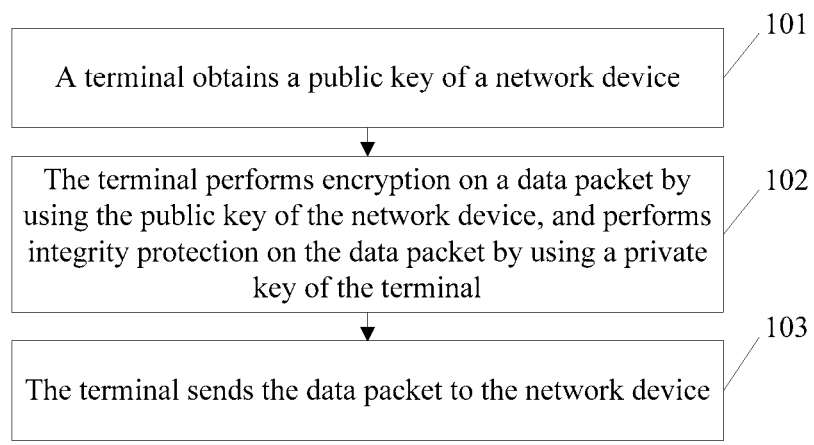
FIG. 4 is a flowchart of a data transmission method according to an embodiment of the present disclosure.

FIG. 4 is a flowchart of a data transmission method according to an embodiment of the present disclosure. The flowchart is applied to the terminal in the foregoing scenario. Referring to FIG. 4, the method includes the following steps.

Step 101: The terminal obtains a public key of a network device.

Step 102: The terminal performs encryption on a data packet by using the public key of the network device, and performs integrity protection on the data packet by using a private key of the terminal, where the data packet includes user data.

The public key is publicly released, and therefore the terminal can obtain the public key of the network device. The private key is a privately owned key. The private key of the terminal is solely owned by the terminal and not open to the public.

Step 103: The terminal sends the data packet to the network device, to send the user data to a server by using the network device.

In this embodiment of the present disclosure, the terminal performs encryption on the data packet by using the public key of the network device and performs integrity protection on the data packet by using the private key of the terminal, and then sends the data packet to the network device, to send the user data to the server by using the network device. In a data transmission process, an asymmetric encryption manner is directly used to perform encryption and integrity protection on the user data, and steps such as performing security authentication and key negotiation with an AAA server are not required. The data transmission process is simple, and transmitted data security is ensured.

Figure 5:
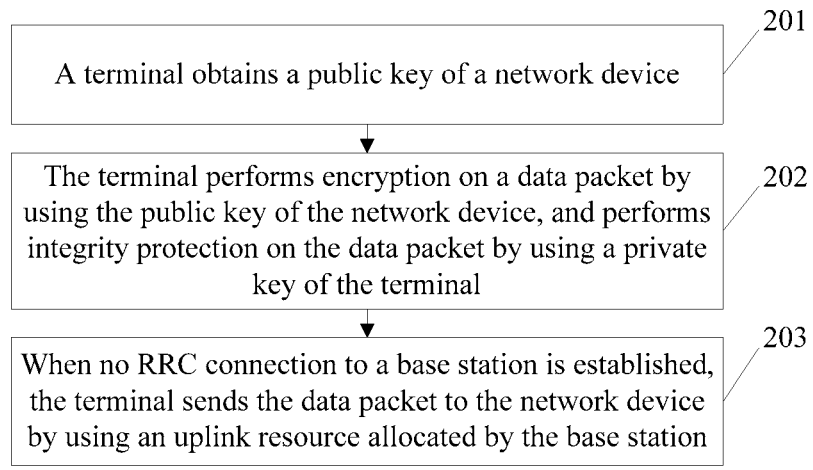
FIG. 5 is a flowchart of another data transmission method according to an embodiment of the present disclosure.

FIG. 5 is a flowchart of a data transmission method according to an embodiment of the present disclosure. The flowchart is applied to the terminal in the foregoing scenario. Referring to FIG. 5, the method includes the following steps.

Step 201: The terminal obtains a public key of a network device.

Specifically, step 201 may include the following steps.

Step 1: The terminal receives system information that is sent by a base station, where the system information includes the public key of the network device.

The public key is publicly released, and therefore the terminal can obtain the public key of the network device.

Further, when the network device is a gateway, the system information may not only include the public key of the network device but also include a network device identifier corresponding to the public key of the network device. For example, the system information may include one or more gateway identifiers and a corresponding gateway public key.

The terminal can select, depending on a service requirement, a public key corresponding to a suitable gateway identifier for data encryption.

Certainly, the terminal may alternatively use a public key corresponding to a same gateway identifier each time, so that data of the terminal is processed by a same gateway, and the gateway does not need to obtain a public key of the terminal from a home subscriber server (except at the first time).

The system information may be a master information block (MIB) or a system information block (SIB). The SIB includes a SIB1, a SIB2, a SIB3, and the like. The MIB and the SIB1 may be sent periodically. Sending time of a SIB other than the SIB1 (such as the SIB2 or the SIB3) is specified in the SIB1.

Step 2: The terminal obtains the public key of the network device from the system information.

The terminal may locally store the public key of the network device once after the terminal obtains the public key of the network device. When step 201 is performed subsequently, the terminal obtains the local public key directly.

Step 202: The terminal performs encryption on a data packet by using the public key of the network device, and performs integrity protection on the data packet by using a private key of the terminal. The data packet includes a user identifier, a uniform resource locator of a server, and user data, and the user identifier is used to identify the terminal in a data transmission process.

The system information further includes algorithm indication information, and the algorithm indication information is used to indicate an encryption algorithm and an integrity protection algorithm that are to be used by the terminal to perform encryption and integrity protection on the data packet.

Specifically, step 202 may include:

obtaining the algorithm indication information from the system information; and performing, by the terminal, encryption and integrity protection on the data packet by using the encryption algorithm and the integrity protection algorithm that are indicated by the algorithm indication information, the public key of the network device, and the private key of the terminal.

Specifically, the public key of the network device is used to change the data packet from a plaintext to a ciphertext; the private key of the terminal is used to protect integrity of the data packet.

In this embodiment, an order of encryption and integrity protection is not limited. Encryption may be performed after integrity protection, or encryption may be performed before integrity protection.

Optionally, the data packet further includes a network device identifier.

Step 203: When no RRC connection to a base station is established, the terminal sends the data packet to the network device by using an uplink resource allocated by the base station, to send the user data to the server by using the network device. The uplink resource allocated by the base station is a resource occupied for sending a preamble sequence by the terminal or a resource occupied for sending an RRC connection setup request message.

Certainly, the terminal may alternatively send, in the connectionless state, the data packet to the network device in another manner.

A small-sized traffic data packet in the present disclosure is very small. Therefore, the foregoing data packet may be sent by using the resource occupied for sending the preamble sequence by the terminal or the resource occupied for sending the RRC connection setup request message, without establishing an RRC connection or an S1 connection.

Specifically, the network device may be a base station or a gateway. When the network device is the base station, the terminal directly sends the data packet to the base station by using the resource occupied for sending the preamble sequence or the resource occupied for sending the RRC connection setup request message. When the network device is the gateway, the terminal sends the data packet to a base station by using the resource occupied for sending the preamble sequence or the resource occupied for sending the RRC connection setup request message, and then, the base station sends the data packet to the gateway by using an Internet Protocol Security (IPsec) tunneling technology.

Further, the method further includes:

when receiving an acknowledgment data packet that is sent by the network device, performing, by the terminal, integrity check on the acknowledgment data packet by using the public key of the network device, to verify validity of a network device identity and integrity of the acknowledgment data packet; and updating the user identifier when the acknowledgment data packet passes integrity check, where the acknowledgment data packet is sent after the network device receives the data packet and the data packet passes integrity check.

The acknowledgment data packet may be encrypted and integrity protected by using the encryption algorithm and the integrity protection algorithm that are indicated by the algorithm indication information, the public key of the terminal, and a private key of the network device Therefore, after receiving the acknowledgment data packet, the terminal may perform decryption by using the private key of the terminal, and perform integrity check by using the public key of the network device. The network device identity is valid only when the acknowledgment data packet passes integrity check, and the terminal updates the user identifier.

Performing integrity protection on the acknowledgment data packet is mandatory, whereas performing encryption processing on the acknowledgment data packet is optional.

Specifically, updating the user identifier may be implemented in the following manner: using the user identifier (a last used user identifier or an initial user identifier) and a random number randomly generated by the terminal that are included in the data packet, as parameters, and calculating a new user identifier by using a preset algorithm. Initially, the user identifier is an international mobile subscriber identity (IMSI) of the terminal.

Further, the data packet may further include the random number, so that the network device can update the user identifier based on the random number.

In this embodiment of the present disclosure, the terminal performs encryption on the data packet by using the public key of the network device and performs integrity protection on the data packet by using the private key of the terminal, and then sends the data packet to the network device when no RRC connection is established, to send the user data to the server by using the network device. In a data transmission process, no RRC connection needs to be established, and steps such as performing security authentication and key negotiation with an AAA server are not required. This reduces signaling overheads and resource consumption. In addition, encryption and integrity protection are performed on the user data in an asymmetric key manner, ensuring transmitted data security in the connectionless state.

Figure 6:
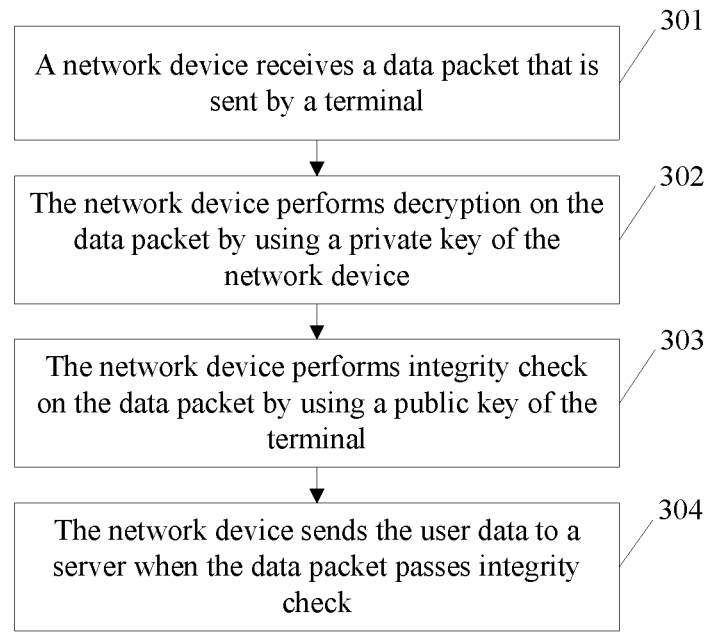
FIG. 6 is a flowchart of another data transmission method according to an embodiment of the present disclosure.

FIG. 6 is a flowchart of a data transmission method according to an embodiment of the present disclosure. The flowchart is applied to the network device (the base station or the gateway) in the foregoing scenario. Referring to FIG. 6, the method includes the following steps.

Step 301: The network device receives a data packet that is sent by a terminal, where the data packet is encrypted by using a public key of the network device and is integrity protected by using a private key of the terminal.

Step 302: The network device performs decryption on the data packet by using a private key of the network device, to obtain user data, where the data packet includes the user data.

The private key is a privately owned key. The private key of the network device is solely owned by the network device and not open to the public.

Step 303: The network device performs integrity check on the data packet by using a public key of the terminal, to verify validity of a terminal identity and integrity of the data packet.

The public key is publicly released, and therefore the network device can obtain the public key of the terminal.

Verifying the integrity of the data packet means performing authentication on the terminal identity. That the data packet passes integrity check means that the terminal identity has been authenticated. That the data packet does not pass integrity check means that the terminal identity fails to be authenticated.

Step 304: The network device sends the user data to a server when the data packet passes integrity check.

In this embodiment of the present disclosure, the network device receives the data packet that is sent by the terminal. The data packet is encrypted by using the public key of the network device and is integrity protected by using the private key of the terminal. After performing decryption on the data packet and verifying the integrity of the data packet, the network device sends the user data to the server. In a data transmission process, an asymmetric encryption manner is directly used to perform encryption and integrity protection on the user data, and steps such as performing security authentication and key negotiation with an AAA server are not required. The data transmission process is simple, and transmitted data security is ensured.

Figure 7:
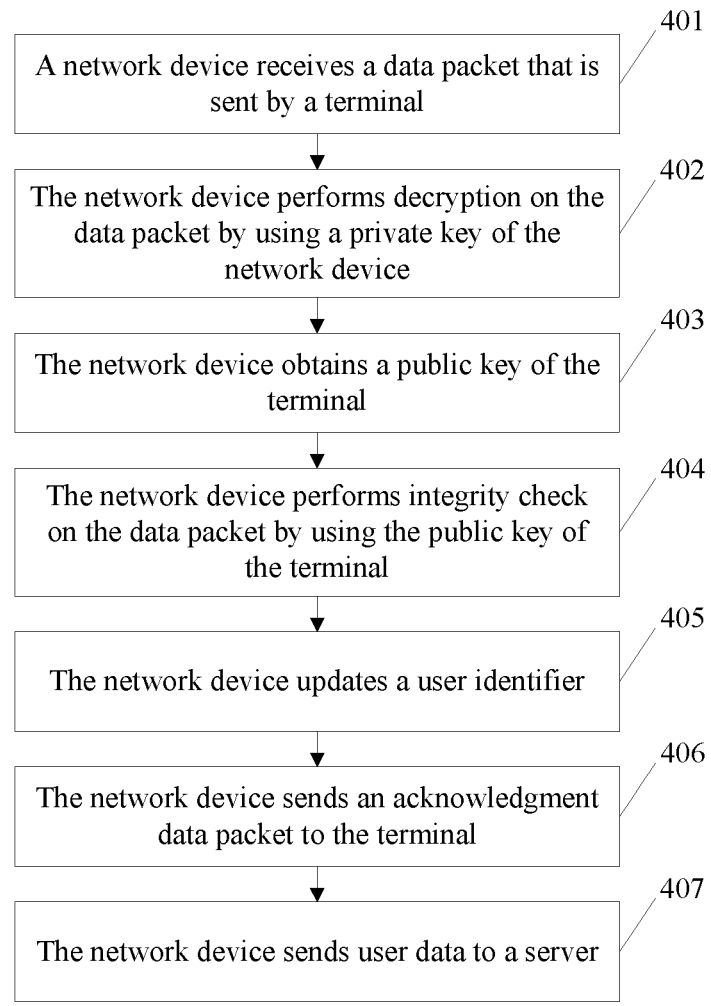
FIG. 7 is a flowchart of another data transmission method according to an embodiment of the present disclosure.

FIG. 7 is a flowchart of a data transmission method according to an embodiment of the present disclosure. The flowchart is applied to the network device (the base station or the gateway) in the foregoing scenario. Referring to FIG. 7, the method includes the following steps.

Step 401: The network device receives a data packet that is sent by a terminal, where the data packet is encrypted by using a public key of the network device and is integrity protected by using a private key of the terminal, and the data packet is sent by the terminal when no RRC connection is established.

The data packet includes a user identifier, a uniform resource locator of a server, and user data, and the user identifier is used to identify the terminal in a data transmission process.

The network device identifies the data packet as a data packet that is sent in a non-RRC-connection state, and processes the data packet in subsequent steps. For the network device, whether the RRC connection has been established between the network device and the terminal is known to the network device. Therefore, if no RRC connection is established, the data packet that is sent by the terminal and that is received by the network device is the foregoing data packet that is sent in the non-RRC-connection state.

Optionally, the data packet further includes a network device identifier.

Step 402: The network device performs decryption on the data packet by using a private key of the network device, to obtain a user identifier, a uniform resource locator of a server, and user data.

The private key is a privately owned key. The private key of the network device is solely owned by the network device and not open to the public.

Step 403: The network device obtains a public key of the terminal.

The obtaining a public key of the terminal may be implemented in the following two implementations:

Implementation 1: The network device obtains the user identifier; the network device obtains, from a home subscriber server based on the user identifier, the public key of the terminal corresponding to the user identifier.

Implementation 2: The network device obtains the user identifier; the network device locally searches for context information corresponding to the user identifier; the network device obtains the public key of the terminal from the context information corresponding to the user identifier.

During specific implementation, the network device may first use implementation 2 to obtain the public key of the terminal; if the public key of the terminal cannot be obtained by using implementation 2, the network device then uses implementation 1 to obtain the public key of the terminal from the home subscriber server.

When the network device is a gateway, that the network device obtains, from a home subscriber server based on the user identifier, the public key of the terminal corresponding to the user identifier includes:

the network device sends the user identifier to the home subscriber server; and the network device receives the user identifier and the corresponding public key of the terminal that are returned by the home subscriber server.

When the network device is a base station, that the network device obtains, from a home subscriber server based on the user identifier, the public key of the terminal corresponding to the user identifier includes:

the network device sends the user identifier to a gateway; and the network device receives the user identifier and the corresponding public key of the terminal that are returned by the gateway, where the public key of the terminal returned by the gateway is obtained by the gateway from the home subscriber server.

Specifically, the network device sends the user identifier to the gateway by using an Internet Protocol Security IPsec tunneling technology, so that the gateway sends the user identifier to the home subscriber server; and the network device receives the user identifier and the corresponding public key of the terminal that are returned by the gateway by using the IPsec tunneling technology.

Step 404: The network device performs integrity check on the data packet by using the public key of the terminal, to verify validity of a terminal identity and integrity of the data packet. If the data packet passes integrity check, step 405 is performed; if the data packet does not pass integrity check, the data packet is discarded.

Specifically, the terminal performs integrity protection on the data packet by using the private key of the terminal and generates an integrity check value MAC-I. The terminal sends the generated integrity check value, together with the data packet, to the network device. The network device performs integrity check on the data packet by using the public key of the terminal and generates an integrity check value MAC-I'. If the value MAC-I' generated by the network device is exactly the same as the value MAC-I that is sent by the terminal, the data packet passes integrity check; if the value MAC-I' is not exactly the same as the value MAC-I, the data packet does not pass integrity check.

Verifying the integrity of the data packet means performing authentication on the terminal identity. That the data packet passes integrity check means that the terminal identity has been authenticated. That the data packet does not pass integrity check means that the terminal identity fails to be authenticated.

Step 405: The network device updates the user identifier.

Specifically, updating the user identifier may be implemented in the following manner: using the user identifier (a last used user identifier or an initial user identifier) and a random number that are included in the data packet, as parameters, and calculating a new user identifier by using a preset algorithm. The random number is randomly generated by the terminal, and may be included in the data packet. In other words, the data packet further includes the random number randomly generated by the terminal. Initially, the user identifier is an IMSI of the terminal.

After completing updating the user identifier, the network device performs mapping between the new user identifier and context information of the terminal and stores the mapping.

Step 406: The network device sends an acknowledgment data packet to the terminal, where the acknowledgment data packet is sent after the network device receives the data packet and the data packet passes integrity check.

Specifically, the network device performs encryption and integrity protection on the acknowledgment data packet by using an encryption algorithm and an integrity protection algorithm that are indicated by algorithm indication information, the public key of the terminal, and the private key of the network device, and then sends the acknowledgment data packet to the terminal.

The acknowledgment data packet is used to confirm that the data packet is received and the terminal completes verification on validity of a network device identity and integrity check on the data packet.

Performing integrity protection on the acknowledgment data packet is mandatory, whereas performing encryption processing on the acknowledgment data packet is optional.

Step 407: The network device sends the user data to the server.

When the network device is a gateway, the sending the user data to the server includes:

obtaining, by the network device, an Internet Protocol (IP) address (which may be specifically found by using a domain name system (DNS)) of the server based on the uniform resource locator of the server; establishing a Transmission Control Protocol (TCP) connection to the server by using the IP address of the server; and sending the user data to the server through the TCP connection.

When the network device is a base station, the sending the user data to the server includes:

sending, by the network device, the uniform resource locator of the server and the user data to a gateway by using the IPsec tunneling technology, so that the gateway sends the user data to the server. A specific process of sending the user data to the server by the gateway is the same as the procedure performed in the case of "when the network device is a gateway, transmitting the user data to the server".

Specifically, the network device may send the uniform resource locator of the server and the user data to the gateway by using the IPsec tunneling technology.

Further, the method further includes:

sending, by the network device, the public key of the network device and the algorithm indication to the terminal.

Specifically, if the network device is a base station, the base station directly sends the public key of the network device, the algorithm indication, and the like to the terminal by using system information.

If the network device is a gateway, the gateway first sends the public key of the network device, the algorithm indication, and the like to a base station, and then, the base station sends the public key of the network device, the algorithm indication, and the like to the terminal by using system information.

Further, when the network device is the gateway, the network device may send a network device identifier corresponding to the public key of the network device to the terminal. Specifically, the system information may be used for implementation. In other words, the system information may further include the network device identifier corresponding to the public key of the network device. For example, the system information may include one or more gateway identifiers and a corresponding gateway public key.

In this embodiment of the present disclosure, the network device receives the data packet that is sent by the terminal. The data packet is encrypted by using the public key of the network device and is integrity protected by using the private key of the terminal, and the data packet is sent by the terminal when no RRC connection is established. After performing decryption on the data packet and verifying the integrity of the data packet, the network device sends the user data to the server. In a data transmission process, no RRC connection to the terminal needs to be established, and steps such as performing security authentication and key negotiation with an AAA server are not required. This reduces signaling overheads and resource consumption. In addition, encryption and integrity protection are performed on the user data in an asymmetric key manner, ensuring transmitted data security in the connectionless state.

Figure 8:
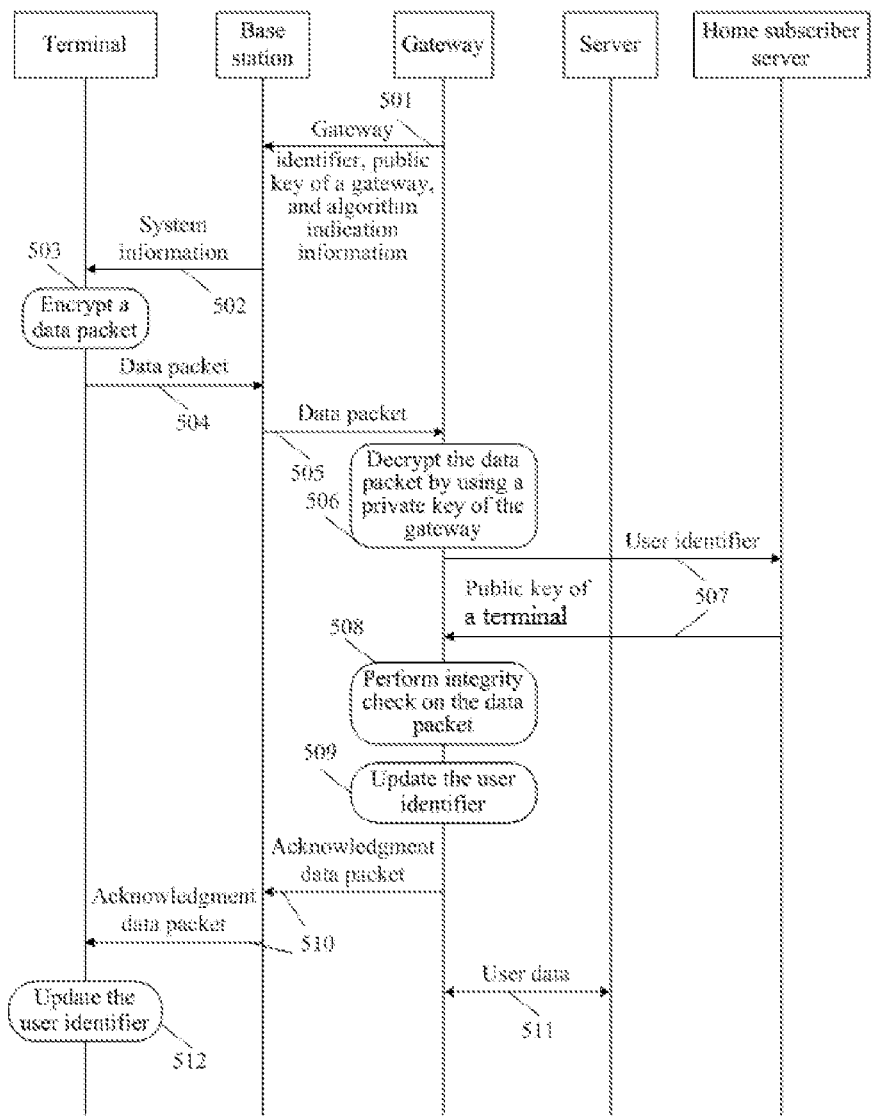
FIG. 8 is a flowchart of another data transmission method according to an embodiment of the present disclosure.

FIG. 8 is a flowchart of a data transmission method according to an embodiment of the present disclosure. Referring to FIG. 8, the method includes the following steps.

Step 501: A gateway sends a gateway identifier, a public key of the gateway, and an algorithm indication to a base station.

Further, the gateway may not only send the public key of the gateway to the base station but also send a gateway identifier corresponding to the public key of the gateway to the base station.

Step 502: The base station sends, to a terminal, the gateway identifier, the public key of the gateway, and the algorithm indication by using system information.

Step 503: The terminal obtains the public key of the gateway from the system information, and performs encryption and integrity protection on a data packet by using an encryption algorithm and an integrity protection algorithm that are indicated by the algorithm indication information, the public key of the gateway, and a private key of the terminal.

Specifically, the public key of the gateway is used to change the data packet from a plaintext to a ciphertext; the private key of the terminal is used to protect integrity of the data packet.

Step 504: The terminal sends the data packet to the base station when no RRC connection is established.

The terminal sends the data packet to the base station by using an uplink resource allocated by the base station. The uplink resource allocated by the base station may be a resource occupied for sending a preamble sequence by the terminal, may be a resource occupied for sending an RRC connection setup request message, or may be another form.

Step 505: The base station sends the data packet to the gateway.

Step 506: The gateway performs decryption on the data packet by using a private key of the gateway, to obtain a user identifier, a uniform resource locator of a server, user data, and a random number.

Step 507: The gateway obtains, from a home subscriber server based on the user identifier, a public key of the terminal corresponding to the user identifier.

Specifically, the gateway sends the user identifier to the home subscriber server and receives the user identifier and the corresponding public key of the terminal that are returned by the home subscriber server.

In the foregoing process, the base station may send an identifier and a public key that are of a same gateway to the terminal each time, so that data of the terminal is processed by the same gateway, and the gateway does not need to obtain the public key of the terminal from the home subscriber server (except at the first time).

That is, in this embodiment of the present disclosure, the public key of the terminal may not only be obtained in the manner in step 507, but also be obtained in the following manner: locally searching for, by the gateway, context information corresponding to the user identifier; and obtaining the public key of the terminal from the context information corresponding to the user identifier.

Step 508: The gateway performs integrity check on the data packet by using the public key of the terminal and verifies validity of a terminal identity. If the data packet passes integrity check, the gateway performs steps 509 and 510; if the data packet does not pass integrity check, the data packet is discarded.

Specifically, the terminal performs integrity protection on the data packet by using the private key of the terminal and generates an integrity check value MAC-I. The terminal sends the generated integrity check value, together with the data packet, to the network device. The network device performs integrity check on the data packet by using the public key of the terminal and generates an integrity check value MAC-I'. If the value MAC-I' generated by the network device is exactly the same as the value MAC-I that is sent by the terminal, the data packet passes integrity check; if the value MAC-I' is not exactly the same as the value MAC-I, the data packet does not pass integrity check.

Step 509: The gateway updates the user identifier.

Specifically, updating the user identifier may be implemented in the following manner: using the user identifier and the random number that are included in the data packet, as parameters, and calculating a new user identifier by using a preset algorithm. The random number is randomly generated by the terminal, and may be included in the data packet. In other words, the data packet further includes the random number randomly generated by the terminal.

Step 510: The gateway sends an acknowledgment data packet to the terminal.

Specifically, the gateway performs encryption and integrity protection on the acknowledgment data packet by using the encryption algorithm and the integrity protection algorithm that are indicated by the algorithm indication information, the public key of the terminal, and the private key of the gateway, and then sends the acknowledgment data packet to the terminal.

Performing integrity protection on the acknowledgment data packet is mandatory, whereas performing encryption processing on the acknowledgment data packet is optional.

Step 511: The gateway sends the user data to the server.

The gateway obtains an Internet Protocol IP address of the server based on the uniform resource locator of the server, establishes a Transmission Control Protocol TCP connection to the server by using the IP address of the server, and sends the user data to the server through the TCP connection.

Figure 9:
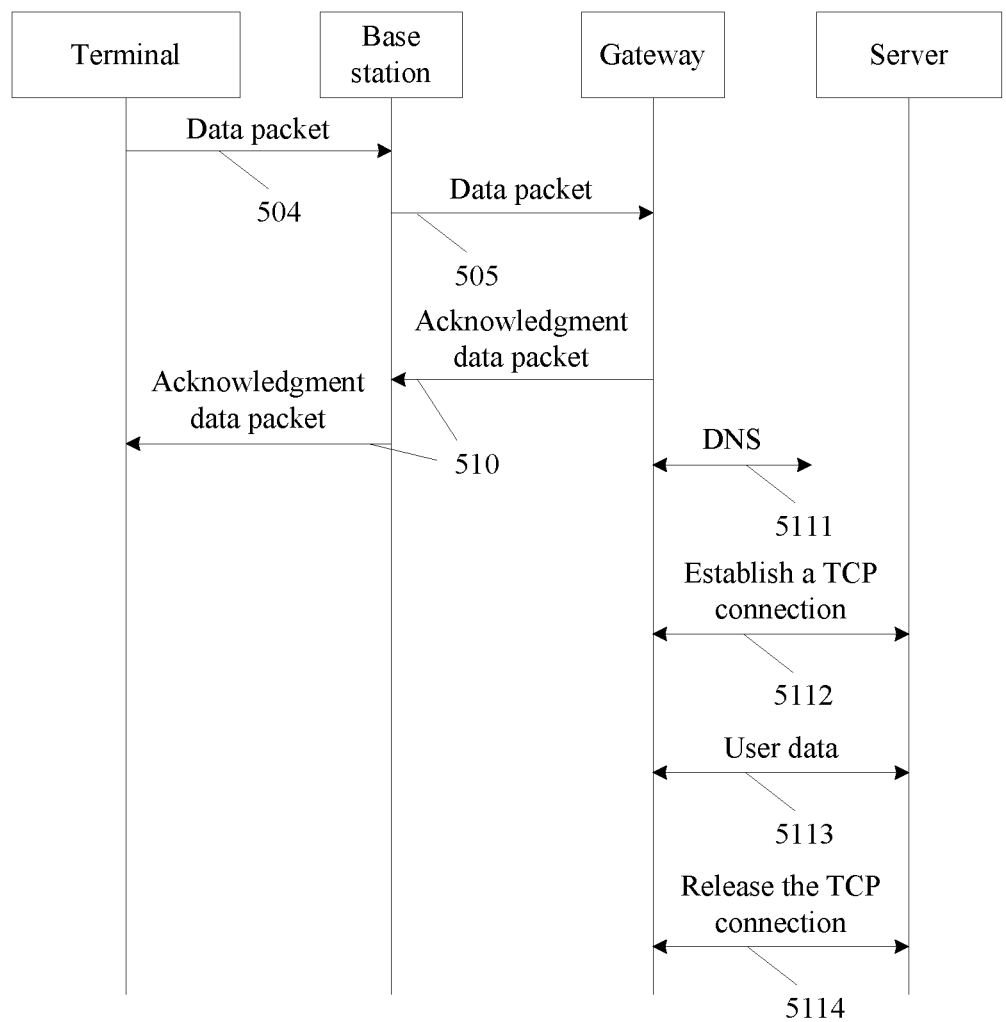
FIG. 9 is a flowchart of data transmission between a gateway and a server according to an embodiment of the present disclosure.

Specifically, as shown in FIG. 9, after obtaining the data packet that is sent by the base station and returning the acknowledgment data packet, the gateway performs the following steps, to complete step 511:

Step S111: The gateway obtains an Internet Protocol IP address of the server by using a DNS server. Specifically, the gateway may obtain the Internet Protocol IP address of the server by using the DNS server (not shown in FIG. 9).

Step S112: The gateway establishes a TCP connection to the server.

Step S113: The gateway sends the user data to the server.

Step S114: The gateway releases the TCP connection between the gateway and the server.

Step 512: The terminal updates the user identifier after receiving the acknowledgment data packet.

Specifically, after receiving the acknowledgment data packet, the terminal performs decryption by using the private key of the terminal, and performs integrity check by using the public key of the gateway, and updates the user identifier only when the acknowledgment data packet passes integrity check. A manner of updating the user identifier is the same as that in step 509.

In this embodiment of the present disclosure, the terminal performs encryption on the data packet by using the public key of the network device and performs integrity protection on the data packet by using the private key of the terminal, and then sends the data packet to the network device when no RRC connection is established, to send the user data to the server by using the network device. In a data transmission process, no RRC connection needs to be established, and steps such as performing security authentication and key negotiation with an AAA server are not required. This reduces signaling overheads and resource consumption. In addition, encryption and integrity protection are performed on the user data in an asymmetric key manner, ensuring transmitted data security in the connectionless state.

Figure 10:
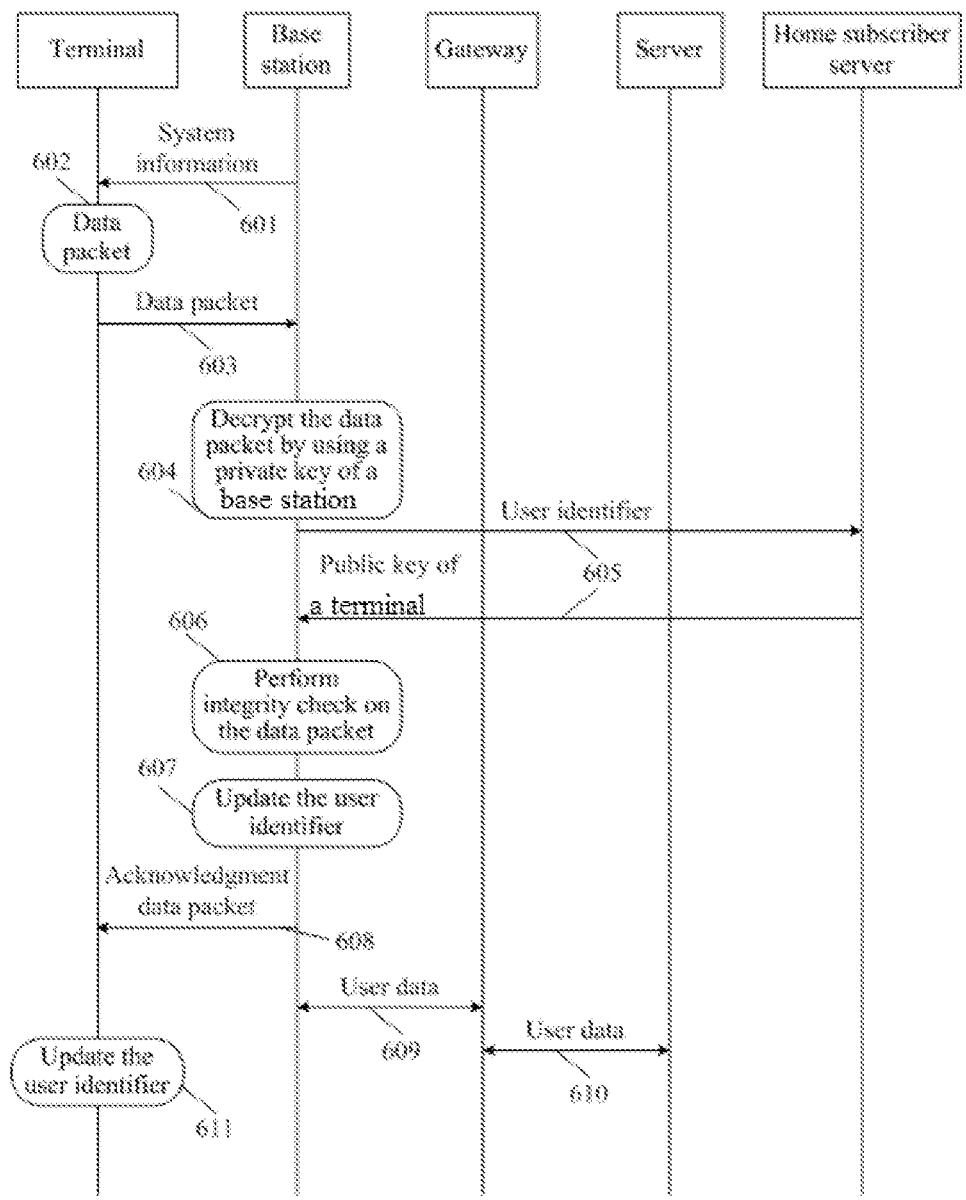
FIG. 10 is a flowchart of another data transmission method according to an embodiment of the present disclosure.

FIG. 10 is a flowchart of a data transmission method according to an embodiment of the present disclosure. Referring to FIG. 10, the method includes the following steps.

Step 601: A base station sends, to a terminal, a public key of the base station and an algorithm indication by using system information.

Step 602: The terminal obtains the public key of the base station and the algorithm indication information from the system information, and performs encryption and integrity protection on a data packet by using an encryption algorithm and an integrity protection algorithm that are indicated by the algorithm indication information, the public key of the base station, and a private key of the terminal.

Specifically, the public key of the base station is used to change the data packet from a plaintext to a ciphertext; the private key of the terminal is used to protect integrity of the data packet.

Step 603: The terminal sends the data packet to the base station when no RRC connection is established.

The terminal sends the data packet to the base station by using an uplink resource allocated by the base station. The uplink resource allocated by the base station may be a resource occupied for sending a preamble sequence by the terminal, may be a resource occupied for sending an RRC connection setup request message, or may be another form.

Step 604: The base station performs decryption on the data packet by using a private key of the base station, to obtain a user identifier, a uniform resource locator of a server, user data, and a random number randomly generated by the terminal.

Step 605: The base station obtains, from a home subscriber server based on the user identifier, a public key of the terminal corresponding to the user identifier.

Specifically, the base station sends the user identifier to a gateway, so that the gateway sends the user identifier to the home subscriber server; and the base station receives the user identifier and the corresponding public key of the terminal that are returned by the gateway. More specifically, the base station sends the user identifier to the gateway by using an IPsec tunneling technology; and the base station receives the user identifier and the corresponding public key of the terminal that are returned by the gateway by using the IPsec tunneling technology.

In this embodiment of the present disclosure, the public key of the terminal may not only be obtained in the manner in step 605, but also be obtained in the following manner: locally searching for, by the base station, context information corresponding to the user identifier; and obtaining the public key of the terminal from the context information corresponding to the user identifier.

Step 606: The base station performs integrity check on the data packet by using the public key of the terminal. If the data packet passes integrity check, the base station performs steps 607 to 609; if the data packet does not pass integrity check, the data packet is discarded.

Specifically, the terminal performs integrity protection on the data packet by using the private key of the terminal and generates an integrity check value MAC-I. The terminal sends the generated integrity check value, together with the data packet, to the network device. The network device performs integrity check on the data packet by using the public key of the terminal and generates an integrity check value MAC-I'. If the value MAC-I' generated by the network device is exactly the same as the value MAC-I that is sent by the terminal, the data packet passes integrity check; if the value MAC-I' is not exactly the same as the value MAC-I, the data packet does not pass integrity check.

Step 607: The base station updates the user identifier.

Specifically, updating the user identifier may be implemented in the following manner: using the user identifier and the random number that are included in the data packet, as parameters, and calculating a new user identifier by using a preset algorithm. The random number is randomly generated by the terminal, and may be included in the data packet. In other words, the data packet further includes the random number randomly generated by the terminal.

Step 608: The base station sends an acknowledgment data packet to the terminal.

Specifically, the base station performs encryption and integrity protection on the acknowledgment data packet by using the encryption algorithm and the integrity protection algorithm that are indicated by the algorithm indication information, the public key of the terminal, and the private key of the base station, and then sends the acknowledgment data packet to the terminal.

Performing integrity protection on the acknowledgment data packet is mandatory, whereas performing encryption processing on the acknowledgment data packet is optional.

Step 609: The base station sends the uniform resource locator of the server and the user data to a gateway.

Specifically, the base station sends the uniform resource locator of the server and the user data to the gateway by using the IPsec tunneling technology.

Step 610: The gateway sends the user data to the server.

The gateway obtains an Internet Protocol IP address of the server based on the uniform resource locator of the server, establishes a Transmission Control Protocol TCP connection to the server by using the IP address of the server, and sends the user data to the server through the TCP connection.

Step 611: The terminal updates the user identifier after receiving the acknowledgment data packet.

After receiving the acknowledgment data packet, the terminal may perform decryption by using the private key of the terminal, and perform integrity check by using the public key of the base station, and update the user identifier only when the acknowledgment data packet passes integrity check. A manner of updating the user identifier is the same as that in step 607.

In this embodiment of the present disclosure, the terminal performs encryption on the data packet by using the public key of the network device and performs integrity protection on the data packet by using the private key of the terminal, and then sends the data packet to the network device when no RRC connection is established, to send the user data to the server by using the network device. In a data transmission process, no RRC connection needs to be established, and steps such as performing security authentication and key negotiation with an AAA server are not required. This reduces signaling overheads and resource consumption. In addition, encryption and integrity protection are performed on the user data in an asymmetric key manner, ensuring transmitted data security in the connectionless state.

Figure 11:
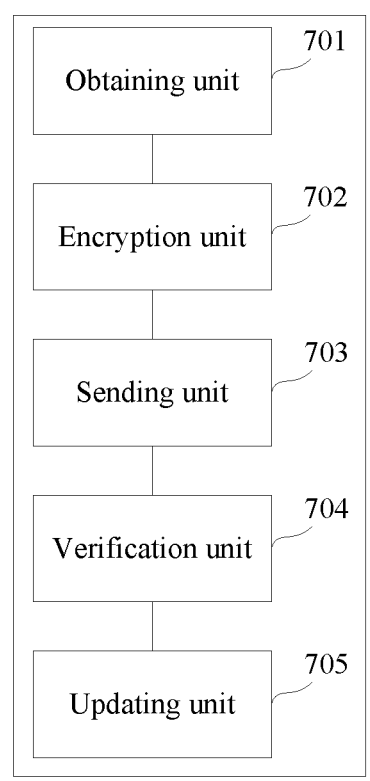
FIG. 11 is a schematic structural diagram of a service transmission apparatus according to an embodiment of the present disclosure.

FIG. 11 is a block diagram of a data transmission apparatus according to an embodiment of the present disclosure. The data transmission apparatus may become a part of a terminal or an entire terminal by using software, hardware, or a combination of software and hardware. The data transmission apparatus may include an obtaining unit 701, an encryption unit 702, and a sending unit 703. The obtaining unit 701 may be implemented by using the processor 10 and the communications unit 30 of the terminal 11. The encryption unit 702 may be implemented by using the processor 10 of the terminal 11. The sending unit 703 may be implemented by using the communications unit 30 of the terminal 11.

The obtaining unit 701 is configured to obtain a public key of a network device.

The encryption unit 702 is configured to perform encryption on a data packet by using the public key of the network device, and perform integrity protection on the data packet by using a private key of the terminal. The data packet includes user data.

The sending unit 703 is configured to send the data packet to the network device, to send the user data to a server by using the network device.

Optionally, the obtaining unit 701 is configured to:

receive system information that is sent by a base station, where the system information includes the public key of the network device; and obtain the public key of the network device from the system information.

Optionally, when the network device is a gateway, the system information further includes a network device identifier corresponding to the public key of the network device.

Optionally, the system information further includes algorithm indication information, and the algorithm indication information is used to indicate an encryption algorithm and an integrity protection algorithm that are to be used by the terminal to perform encryption and integrity protection on the data packet.

Optionally, the encryption unit 702 is configured to:

obtain the algorithm indication information from the system information; and perform encryption and integrity protection on the data packet by using the encryption algorithm and the integrity protection algorithm that are indicated by the algorithm indication information, the public key of the network device, and the private key of the terminal.

Optionally, the sending unit 703 is configured to:

send the data packet to the network device when no RRC connection is established.

Optionally, the sending unit 703 is configured to:

when no radio resource control RRC connection to the base station is established, send the data packet to the network device by using an uplink resource allocated by the base station, where the uplink resource allocated by the base station is a resource occupied for sending a preamble sequence by the terminal or a resource occupied for sending an RRC connection setup request message.

Optionally, the data packet further includes a user identifier and a uniform resource locator of a server. The user identifier is used to identify the terminal in a data transmission process.

Optionally, the apparatus further includes:

a verification unit 704, configured to: when an acknowledgment data packet that is sent by the network device is received, perform integrity check on the acknowledgment data packet by using the public key of the network device, to verify validity of a network device identity and integrity of the acknowledgment data packet; and an updating unit 705, configured to update the user identifier when the acknowledgment data packet passes integrity check, where the acknowledgment data packet is sent after the network device receives the data packet and the data packet passes integrity check.

Optionally, the network device is a base station or a gateway.

Figure 12:
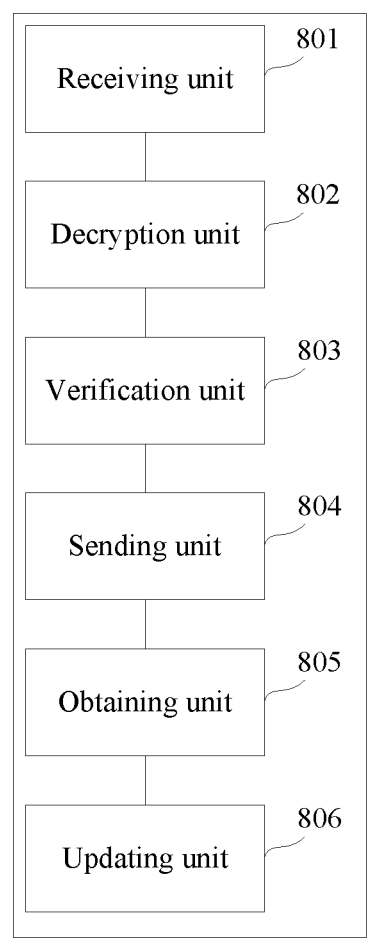
FIG. 12 is a schematic structural diagram of another service transmission apparatus according to an embodiment of the present disclosure.

FIG. 12 is a block diagram of a data transmission apparatus according to an embodiment of the present disclosure. The data transmission apparatus may become a part of the base station 12 or the gateway 13 or the entire base station 12 or the entire gateway 13 by using software, hardware, or a combination of software and hardware. The data transmission apparatus may include a receiving unit 801, a decryption unit 802, a verification unit 803, and a sending unit 804. The receiving unit 801 may be implemented by using a receiver of the base station 12 or a communications interface of the gateway 13. The decryption unit 802 and the verification unit 803 may be implemented by using a processor of the base station 12 or the gateway 13. The sending unit 804 may be implemented by using a transmitter of the base station 12 or a communications interface of the gateway 13.

The receiving unit 801 is configured to receive a data packet that is sent by a terminal. The data packet is encrypted by using a public key of a network device and is integrity protected by using a private key of the terminal.

The decryption unit 802 is configured to decrypt the data packet by using a private key of the network device, to obtain user data. The data packet includes the user data.

The verification unit 803 is configured to perform integrity check on the data packet by using a public key of the terminal, to verify validity of a terminal identity and integrity of the data packet.

The sending unit 804 is configured to send the user data to a server when the data packet passes integrity check.

Optionally, the data packet is sent by the terminal when no RRC connection is established.

Optionally, the data packet further includes a user identifier. The user identifier is used to identify the terminal in a data transmission process.

Optionally, the apparatus further includes:

an obtaining unit 805, configured to obtain the public key of the terminal.

In a possible implementation, the obtaining unit 805 is configured to:

obtain the user identifier; and obtain, from a home subscriber server based on the user identifier, the public key of the terminal corresponding to the user identifier.

In another possible implementation, the obtaining unit 805 is configured to:

obtain the user identifier;

locally search for context information corresponding to the user identifier; and obtain the public key of the terminal from the context information corresponding to the user identifier.

In a possible implementation, the obtaining unit 805 is configured to:

send the user identifier to the home subscriber server; and receive the user identifier and the corresponding public key of the terminal that are returned by the home subscriber server.

In another possible implementation, the obtaining unit 805 is configured to:

send the user identifier to a gateway; and receive the user identifier and the corresponding public key of the terminal that are returned by the gateway, where the public key of the terminal returned by the gateway is obtained by the gateway from the home subscriber server.

Optionally, the data packet further includes a uniform resource locator of the server.

In a possible implementation, the sending unit 804 is configured to:

obtain an Internet Protocol IP address of the server based on the uniform resource locator of the server;

establish a Transmission Control Protocol TCP connection to the server by using the IP address of the server; and send the user data to the server through the TCP connection.

In another possible implementation, the sending unit 804 is configured to:

send the uniform resource locator of the server and the user data to a gateway, so that the gateway sends the user data to the server.

Optionally, the apparatus further includes:

an updating unit 806, configured to update the user identifier when the data packet passes integrity check.

Optionally, the sending unit 804 is further configured to:

send an acknowledgment data packet to the terminal after the data packet passes integrity check, where the acknowledgment data packet is sent after the network device receives the data packet and the data packet passes integrity check.

Optionally, the sending unit 804 is further configured to:
send the public key of the network device and algorithm indication information to the terminal.

Optionally, the sending unit 804 is further configured to:
send a network device identifier corresponding to the public key of the network device to the terminal.

It should be noted that when the data transmission apparatus provided in the foregoing embodiment transmits data, division of the foregoing function modules is used as an example for illustration. In actual application, the foregoing functions may be allocated to different function modules and implemented depending on a requirement, that is, an inner structure of a device is divided into different function modules to implement some or all of the functions described above. In addition, the data transmission apparatus provided in the foregoing embodiment and the data transmission method embodiments belong to a same idea. For a specific implementation process of the data transmission apparatus, refer to the method embodiments, and details are not repeated herein.

A person of ordinary skill in the art may understand that some or all of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data transmission method, the method comprising:
obtaining, by a terminal, a public key of a network device;
performing, by the terminal, encryption on a data packet by using the public key of the network device, and performing integrity protection on the data packet by using a private key of the terminal, wherein the data packet comprises user data; and
sending, by the terminal, the data packet to the network device,
wherein the data packet further comprises a user identifier and a uniform resource locator of a server, and the user identifier identifies the terminal in a data transmission process,
when receiving an acknowledgment data packet from the network device, performing, by the terminal, an integrity check on the acknowledgment data packet by using the public key of the network device, to verify validity of a network device identity and integrity of the acknowledgment data packet; and
updating, by the terminal, the user identifier when the acknowledgment data packet passes the integrity check, wherein the acknowledgment data packet is sent after the network device receives the data packet and the data packet passes the integrity check.

2. The method according to claim 1, wherein obtaining, by the terminal, the public key of the network device comprises:
receiving, by the terminal, system information from a base station, wherein the system information comprises the public key of the network device; and
obtaining, by the terminal, the public key of the network device from the system information.

3. The method according to claim 2, wherein sending, by the terminal, the data packet to the network device comprises:
sending, by the terminal, the data packet to the network device when no radio resource control (RRC) connection is established.

4. The method according to claim 3, wherein sending, by the terminal, the data packet to the network device when no RRC connection is established comprises:
when no RRC connection to the base station is established, sending, by the terminal, the data packet to the network device by using an uplink resource allocated by the base station.

5. The method according to claim 1, wherein the network device is a base station or a gateway.

6. A data transmission apparatus, wherein the apparatus comprises:
a processor, configured to:
obtain a public key of a network device,
perform encryption on a data packet by using the public key of the network device, and
perform integrity protection on the data packet by using a private key of a terminal, wherein the data packet comprises user data; and
a communications unit, configured to send the data packet to the network device,
wherein the data packet further comprises a user identifier and a uniform resource locator of a server, and the user identifier identifies the terminal in a data transmission process,
wherein the processor is further configured to:
when an acknowledgment data packet from the network device is received, perform an integrity check on the acknowledgment data packet by using the public key of the network device, to verify validity of a network device identity and integrity of the acknowledgment data packet; and
update the user identifier when the acknowledgment data packet passes the integrity check, wherein the acknowledgment data packet is sent after the network device receives the data packet and the data packet passes the integrity check.

7. The apparatus according to claim 6, wherein processor is configured to:
obtain the public key of the network device from a system information received from a base station, wherein the system information comprises the public key of the network device.

8. The apparatus according to claim 7, wherein the communications unit is configured to:
send the data packet to the network device when no radio resource control (RRC) connection is established.

9. The apparatus according to claim 8, wherein the communications unit is configured to:
when no RRC connection to the base station is established, send the data packet to the network device by using an uplink resource allocated by the base station.

10. The apparatus according to claim 6, wherein the network device is a base station or a gateway.

* * * * *